US005231733A

United States Patent [19]

Dittman

[11] Patent Number: 5,231,733
[45] Date of Patent: Aug. 3, 1993

[54] AID FOR GRASPING ROUND KNOBS

[76] Inventor: Sydney C. Dittman, 5838 Indian Trail, Houston, Tex. 77057, by Ralph E. Dittman, legal representative

[21] Appl. No.: 868,250

[22] Filed: Apr. 14, 1992

[51] Int. Cl.[5] .................... E05B 1/00; B25J 1/00

[52] U.S. Cl. .................... 16/114 R; 16/115; 29/271; 29/278; 81/53.11; 81/124.4; 269/287; 269/1; 294/19.1

[58] Field of Search .................... 294/19.1, 19.2, 64.1; 29/270, 271, 278; 269/1, 3, 265, 270, 287, 900; 81/53.11, 124.4; 16/114 R, 115

[56] References Cited

U.S. PATENT DOCUMENTS 1,668,043 5/1928 Bixly .
2,127,181 8/1938 Mattern .................... 29/278
2,243,106 5/1941 Limbert .................... 81/53.11
2,637,587 5/1953 Robinson .................... 81/53.11
2,721,597 10/1955 Pitrella .
2,808,282 10/1957 Peoples .
2,878,701 3/1959 Weersma .................... 81/124.4
3,262,585 7/1966 Olson .
3,582,116 6/1971 Young .
3,656,793 4/1972 Mathews .
3,909,055 9/1975 Koppel .
4,248,465 2/1981 Halstead .
4,266,320 5/1981 Grant .
4,314,723 2/1982 Vermillion .................... 81/53.11
4,397,489 8/1983 Lind .
4,679,556 7/1987 Lubock .
4,783,883 11/1988 Szalay .
4,971,375 11/1990 Grecco .
5,103,695 4/1992 Dolk et al. .................... 81/53.11

*Primary Examiner*—W. Donald Bray
*Attorney, Agent, or Firm*—Pravel, Hewitt, Kimball & Krieger

[57] ABSTRACT

Apparatus for grasping circular knobs which may be attached to drawers or doors of cabinets or the like including a generally dome-shaped grasping element having a handle attached thereto and extending outwardly therefrom. The internal surface of the generally dome-shaped element includes a series of internal shoulders of various diameters for the purpose of grasping knobs of various sizes so that the handicapped person may more easily manipulate the drawer or door to which the knob is attached.

4 Claims, 1 Drawing Sheet

AID FOR GRASPING ROUND KNOBS

FIELD OF THE INVENTION

This invention relates to a device for grasping drawer or cabinet knobs which is particularly useful to physically impaired persons who would otherwise, due to such impairment, have great difficulty in opening and closing drawers or cabinets utilizing such knobs.

BACKGROUND OF THE INVENTION

Generally, many cabinet doors and drawers utilize round metal or ceramic knobs for readily opening and closing such cabinet doors or drawers. Such knobs are used at many locations at the home as well as in business. While persons having normally functioning motor control find the grasping of such knobs an easy task, unfortunately, such is not the case for those who are physically handicapped. Whether such persons are so handicapped that they lack any use or motor control of their hands or have limited motor control, objects as small as knobs for drawers and cabinet doors cannot be easily grasped.

There is therefore a need for a device which may be permanently or temporarily positioned over a drawer or cabinet knob to grasp the knob and provide an extended handle portion which may be more easily gripped by a handicapped person. Insofar as known, there is no device to accomplish these goals. The most pertinent U.S. patent is Koppel U.S. Pat. No. 3,909,055 which discloses a device for retrieving small sheets such as radiographs from a tank. The grasping element is a suction element having an external rim adapted to engage the surface of the radio graphs and grasp the radiograph using the principle of suction. The grasping element is connected to an elongated handle. Mathews U.S. Pat. No. 3,656,793 is directed to an Extension for Bath Faucet Valve Operators and includes a grasping element having a series of circumferentially spaced, internal ridges to physically engage a faucet handle. Another such device is the Faucet Extender of U.S. Pat. No. 4,266,320. There are a series of patents directed to utilization of a lever which is mounted over a door knob to extend radially therefrom. Such patents include Lind U.S. Pat. No. 4,397,489 directed to an adapter for providing a lever attachment to a round door knob. The purpose of the lever-type door knob as disclosed in the '489 patent is to assist the handicapped in their access to public facilities. Handicapped people have difficulty in turning door knobs and thus the lever-type door knob is highly recommended. The purpose of the '489 patent is to convert a round door knob into a lever-operated knob without having to replace the round knob. Other U.S. patents having similar goals include Szalay U.S. Pat. No. 4,783,883; Grecco U.S. Pat. No. 4,971,375; and, Peoples U.S. Pat. No. 2,808,282. Other patents known to Applicant but even less pertinent include Olson U.S. Pat. Nos. 3,262,585 directed to recovering floating objects. See also U.S. Pat. Nos. 4,248,465; 4,679,556; 3,582,116; 2,721,597; and 1,668,043.

SUMMARY OF THE INVENTION

It is the object of this invention to provide a new and improved device for aid in grasping door or cabinet knobs, which is of particular benefit to physically impaired persons. Such a device includes a generally dome-shaped grasping element having a gripping member or handle attached thereto. The grasping element includes an internal recess for grasping a knob which may be located, for example, on a cabinet door or drawer. The gripping element extends outwardly from the grasping element to provide a handle which may be more easily gripped by a physically handicapped person. The recess of the generally dome-shaped grasping element includes an internal surface area including a series of stepped shoulders in order to conform to the external surface of various sizes of the knobs and grasp the knob so that a physically handicapped person can more easily manipulate the knob and thus the attached drawer or cabinet or other device.

This Summary is intended to merely summarize the invention without limiting any aspect of the invention. The invention will now be described in a preferred embodiment and claims, with the claims being the measure of the scope of the invention.

DESCRIPTION OF THE PREFERRED EMBODIMENT

Figure 1:
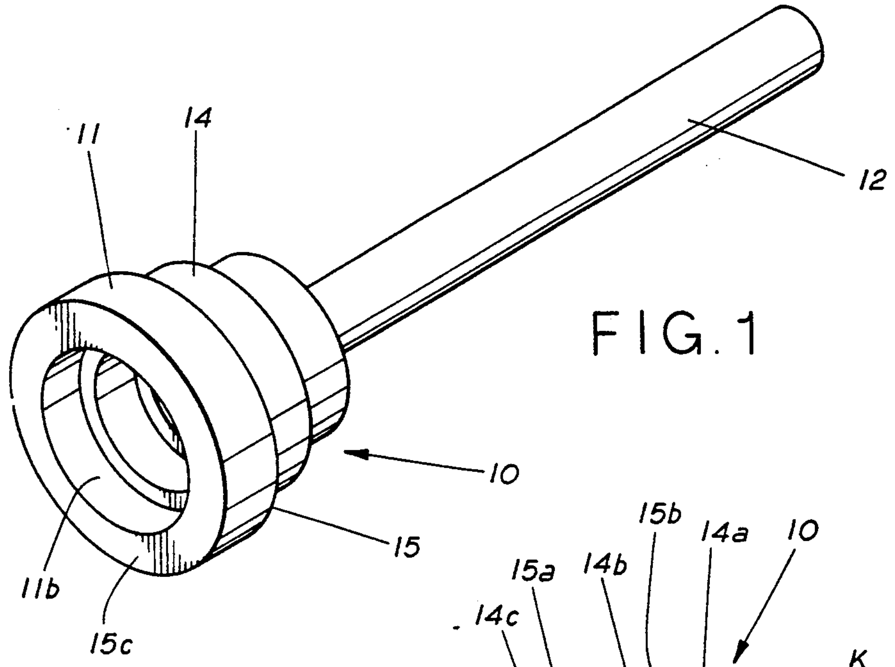
FIG. 1 is a perspective view of the grasping member of the preferred embodiment of this invention.
Figure 2:
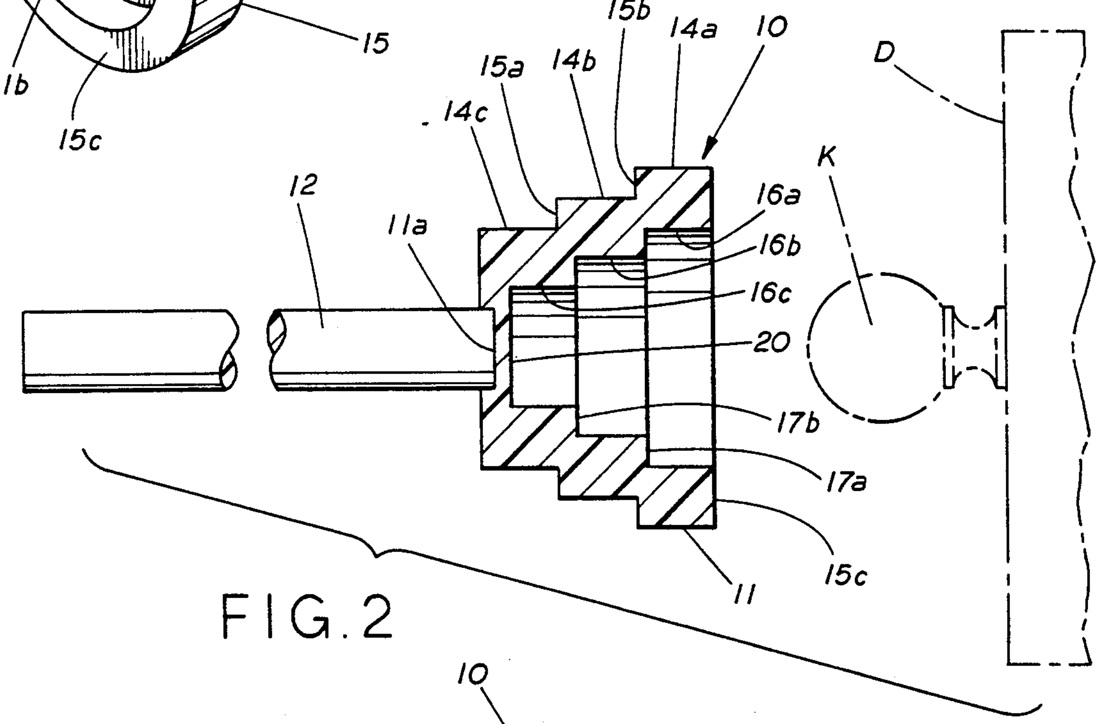
FIG. 2 is a side view partly in section illustrating the internal surface area utilized for grasping a knob attached to a drawer or cabinet door.

An aid or device for grasping knobs K which may be attached to doors or cabinet drawers is generally designated as 10 in FIGS. 1–2. The grasping aid 10 includes generally dome-shaped grasping element 11 which includes a first recess 11*a* and a second recess 11*b*. The first recess 11*a* is generally cylindrical in configuration and is adapted to receive the longitudinally extending gripping member or handle 12. The gripping member or handle 12 is generally an elongated, cylindrical member which is seated in the recess 11*a* and is held in the recess by a suitable attaching means such as glue or the like. The gripping member 12 extends outwardly from the dome-shaped grasping element 11 so that, when the dome-shaped grasping element 11 is actually attached to a knob K, the gripping element or handle 12 extends outwardly so that a physically handicapped person may grasp the device 10 and thus manipulate the drawer or door D to which the knob K is attached.

The generally dome-shaped grasping element 11 as illustrated in the preferred embodiment in FIGS. 1–3 includes a series of external, circumferential shoulders generally designated as 15 and rims generally designated as 14 to provide an overall stepped configuration as follows. Three generally longitudinally extending rims 14*a*, 14*b* and 14*c* are interconnected by transversely extending shoulders 15*a* and 15*b* in order to provide a generally stepped configuration to the external surface of the generally dome-shaped grasping member 11. The diameter of each of the circumferential, longitudinally extending rims or faces 14*a*, 14*b* and 14*c* is different and decreasing from the largest diameter at 14*a* to the smallest diameter at 14*c*. The grasping element 11 terminates in a lower, circumferential rim or face 15*c*.

Figure 3:
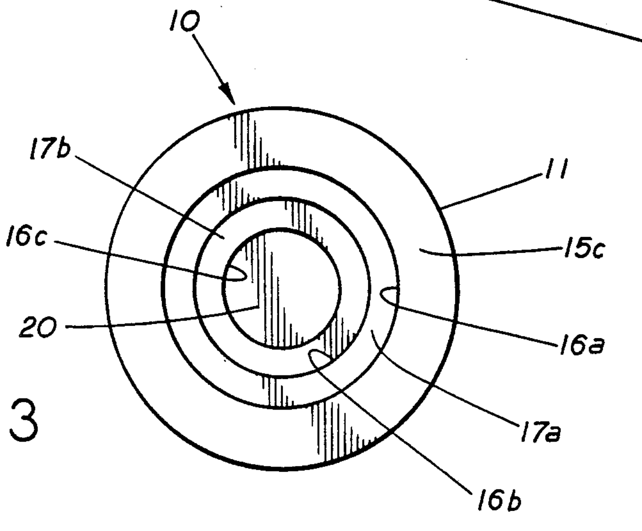
FIG. 3 is an end view of the grasping element further illustrating the internal shoulders of the grasping element of this invention.

The internal surface area formed by the second recess 11*b* is illustrated in FIGS. 1–3. The second, internal recess generally designated as 11*b* includes a first internal longitudinally extending rim surface 16*a* which connects to an internal transversely extending shoulder surface 17*a*. A further reduced, longitudinally extending internal surface 16*b* extends further inwardly from the transverse, circumferential shoulder 17*a* and terminates in a transverse, circumferential surface 16*c* or shoulder 17*b*. A third, longitudinally extending circumferential surface extends inwardly from transverse surface 17*b* and terminates in circular end face 20.

In this manner, the internal surface of the second recess 11*b* of the generally dome-shaped, grasping member 11 includes a series of stepped, internal and longitudinally extending surfaces 16*a–c* which cooperate with internal, transversely extending shoulders 17*a* and 17*b* to engage a knob K such that a suction may be formed with the knob in order to grasp the knob so that the handicapped person may utilize the extended handle 12 to manipulate the drawer or door D to which the knob K is attached.

The material for the generally dome-shaped member 11 may be a soft plastic, rubber or other deformable material such that the internal surface of the second recess 11*b* will more easily conform to the particular shape of the knob K being contacted and provide a suction herewith. It has been determined that the device 10 of this invention will grasp knobs K which are spherical or substantially spherical so that a round or circumferential surface on the knob can be grasped by element 11. It should be understood that the material of the grasping element Il and the handle 12 may be the same material so that the device 10 may be molded or otherwise manufactured in one piece.

In operation and use, the grasping aid 10 may be permanently attached to the series of knobs K, such as for example located in a particular room used by handicapped persons. In that instance, it may be desirable to utilize some glue to help the grasping element 11 maintain a permanent engagement with the knob K because any suction used to grasp the knob will dissipate with time. In the alternative, if the physically handicapped person is able, the handicapped person may utilize the grasping aid 10 to grasp any desired drawer or door knob K for the purpose of manipulating that particular door or knob. In that instance, the handicapped person may utilize a hand or perhaps even teeth to position the internal grasping surface 11*b* over the knob such that one of the internal surfaces 16*a*, 16*b* or 16*c*, in cooperation with transverse shoulders 17*a* and 17*b*, may grasp the knob by a combination of friction and suction so that the user can manipulate the drawer or door to which the knob is mounted.

The knobs that may be grasped with the device 10 may be of varying sizes so long as the internal recess 11*b* will receive the knob so that a combination of the internal rims 16*a–c* and shoulders 17*a–b* will grasp the knob. The combination of stepped shoulders and surfaces of varying diameters also allows the internal recessed area 11*b* to fit over a round knob which is not exactly spherical and to grasp such a knob from various angles.

Having described the invention above, various modifications of the techniques, procedures, material and equipment will be apparent to those in the art. For example, the knob K is described herein as being attached to a drawer in a known manner. The shape of the knob could be incorporated into other devices so that the grasping aid 10 of this invention could be utilized. It is intended that all such variations within the scope and spirit of the appended claims be embraced thereby.

I claim:

1. Apparatus for grasping knobs or other circular elements which may be attached to a drawer or door, comprising:

a generally dome-shaped grasping element including an internal recess for grasping a knob which may be located, for example, on a cabinet door or drawer or elsewhere;

a gripping member attached to said generally dome-shaped grasping element, said gripping element extending outwardly from said generally dome-shaped element to provide a member which may be more easily gripped by a physically handicapped person; and said internal recess including an internal surface area which is adapted to conform to the external surface of a knob and grasp said knob so that a physically handicapped person can more easily manipulate that knob;

said internal surface area of said internal recess including a series of internal, stepped shoulders to grasp knobs of various sizes, including at least first and second longitudinally extending surface areas joined to internal, transversely extending shoulders to provide a series of surfaces and shoulders of varying diameters to grasp knobs of various sizes or various surface portions of such knobs.

2. The structure set forth in claim 1, including:

said generally dome-shaped grasping element including a second recess to receive said gripping member for attachment to said grasping element.

3. The structure set forth in claim 1, including:

said gripping member being elongated so that a handicapped person can more easily grip the member.

4. The structure set forth in claim 1, including:

said dome-shaped grasping element including at least first and second longitudinally extending surface area joined to external transversely extending shoulders to provide areas to receive one or more fingers of a handicapped person to facilitate manipulation of the entire apparatus.

* * * * *